(12) United States Patent
Honjyou

(10) Patent No.: US 6,307,534 B1
(45) Date of Patent: Oct. 23, 2001

(54) COMPUTER DATA RE-PRESENTATION METHOD AND APPARATUS

(75) Inventor: Terubumi Honjyou, Hiratsuka (JP)

(73) Assignee: Eastech Corporation, Tokyo (JP)

( * ) Notice: Subject to any disclaimer, the term of this patent is extended or adjusted under 35 U.S.C. 154(b) by 0 days.

(21) Appl. No.: 09/275,870

(22) Filed: Mar. 25, 1999

Related U.S. Application Data (63) Continuation-in-part of application No. 09/263,565, filed on Mar. 8, 1999.

(30) Foreign Application Priority Data

Dec. 24, 1998 (JP) .................................................. 10-378273

(51) Int. Cl.[7] .................................. G09G 5/00; G09G 5/08
(52) U.S. Cl. ......................... 345/156; 345/163; 345/168; 345/169; 345/172
(58) Field of Search ................................... 345/172, 168, 345/164, 163; 235/375; 463/39

(56) References Cited

U.S. PATENT DOCUMENTS

| | | | |
|---|---|---|---|
| 5,233,167 | * 8/1993 | Markman et al. | 235/375 |
| 5,605,505 | * 2/1997 | Han | 463/39 |
| 5,896,125 | * 4/1999 | Niedzwiecki | 345/168 |
| 5,920,308 | * 7/1999 | Kim | 345/169 |
| 6,014,131 | * 1/2000 | Barry et al. | 345/172 |

* cited by examiner

Primary Examiner—Bipin Shalwala
Assistant Examiner—David L. Lewis
(74) Attorney, Agent, or Firm—William W. Haefliger (57) ABSTRACT

A personal computer having internal driving circuitry, a key data input keyboard, and a mouse for computer cursor control, the improvement apparatus for effecting re-presentation by the computer of selected pre-prepared start-up data, comprising mouse signal representation circuitry operatively connecting to the mouse and to the computer internal circuitry, responsive to remote control operation to input pre-prepared data to the computer, and there also being a mouse signal line or lines operatively connected to the computer internal circuitry, and a keyboard signal line or lines operatively connected to the computer internal circuitry.

26 Claims, 7 Drawing Sheets

COMPUTER DATA RE-PRESENTATION METHOD AND APPARATUS

This application is a continuation-in-part of Ser. No. 09/263,565 filed Mar. 8, 1999 incorporated herein by reference.

BACKGROUND OF THE INVENTION

This invention concerns improvements in personal computer systems, and specifically automatic mouse operation systems. The improvements are provided to memorize the PC mouse operation processes, to reproduce them, and to operate the PC mouse, automatically.

Up to now, operation of a personal computer (PC) has been extremely difficult and puzzling for the inexperienced beginner. Various guide books and instruction manuals have been prepared, and also in PC software explanatory notes are included in the form of "HELP" displays on the screen.

On the other hand, when the beginner reads these materials, tries to understand them, and tries to operate the PC according to the operational instructions, he or she is sure to meet with difficulties in the PC basic operations, because of little or no background knowledge of specialized terminology and also because of initial inability to locate the position of the correct designated object on the display.

Therefore, in case of no support or no guidance from the operation expert, the beginner is compelled to repeat what is called "trial and error", or to waste time and labor looking into the explanatory booklet.

A series of PC operations such as PC start-up and stop operations, for connecting to PC telecommunications etc. require repetition of the same or similar operations, each use time.

Even the experienced operator finds such repeated operations troublesome, and wishes to have them eliminated. Especially to the inexperienced operator, these repeated operations have become a major reason for causing resistance as well as enmity against the PC.

Currently, as one means of simplifying these operational jobs, the command signal is pre-registered as part of the start-up program by function key operation of the keyboard, and at the time the PC is switched on, the means for running these programs automatically, or the means for using the Macro program, are put into effect.

However, the so-called Macro function is hardly suitable for general purposes, so that it is difficult to add, subsequently, the Macro function to the software without the Macro function previously installed.

In addition, the production of software with the Macro function installed, at the early production stage, leads to substantial increases in the number of program steps which eventually brings about a substantial increase in the number of production processes, in the development periods, and in development cost.

Accordingly, the use of commercial software for business use with the Macro function installed has been minimal.

For these reasons simplification of the PC operation has not been desirably advanced, so that in order to learn how to operate the PC, it has been necessary to try to read the thick and obtuse instruction manual and to understand its contents and to repeat "Trial and Error" in the PC operation. Even experienced operators have to repeat troublesome operations.

As regards currently used software, with the Macro function installed, which is designed for similar objectives, the operations involved at the time of memorizing the data are complicated, and the processes are not visible to the user at the time of reproducing the PC operation, so that such software is not suitable for use in learning mouse operations required to reach the designated display.

SUMMARY OF THE INVENTION

The present invention seeks to eliminate such problems and inconveniences, as earlier mentioned.

In accordance with the invention, PC user knowledgeable in the use of the designated software first operates the PC to pre-store in the memory the PC operation information, employing mouse operation process data for each designated job, and its operation interval time data combined, by use of memory means with a retrieval number, combined.

Because of such pre-arrangement for memory, the beginner, by merely designating the identification number and switching on the start-up signal, is able to re-produce a series of mouse operation data pre-stored in the memory as earlier referenced, in accordance with the pre-memorization and thereby causes the responding PC to represent or display information in accordance with mouse operations, one after another. This makes possible the automatic performance of PC operation tasks.

In accordance with the invention, the mouse operation data representation system incorporates an exterior adapter device for the PC, with a microcomputer installed therein, exclusively for the mouse control, and which operates in parallel to and independently of the PC main driving circuitry. That exterior adaptor device is equipped with a remote control table and facilities for key data transmission and reception.

The mouse operation data representation system is designed to memorize and reproduce the mouse operation data, by connection of the mouse and its exterior adaptor device to the serial port and to the mouse socket, at the PC, employing connecting cables for operation in concert with programs installed in the PC and installed in the microcomputer.

At the time of operating the data memory mode of the afore-mentioned mouse operation representation system, the mouse click code signal is stored in the memory of the program in steps detailed as follows:

By operation of the mouse connected to the afore-mentioned exterior adaptor device, the click signal output from the mouse is coded in the afore-mentioned microcomputer at that device, and the mouse click code signal is inputted into the PC in real time via the signal lead connecting the adapter device to the serial port of the PC.

By operation of the mouse and the data memory/reproduction program installed in the PC, the afore-mentioned mouse click code signal input is identified as the mouse click operation, and the data obtained for the values of X and Y coordinates of the mouse cursor on the display, by means of the coordinates retrieval command of the program, are set as the data for the cursor coordinates position on the display at the time of the click.

Further on, the time interval between a previous click and the next click is computed by the program, and this value is set as the click time interval data. These click time interval data and the afore-mentioned mouse cursor coordinates data are combined in the form of one set, and multiple sets of such data obtained in such manner, as above, are stored in the memory of the program by giving the address number designated by the user.

At the time of reproduction operation mode of the afore-mentioned mouse operation representation system, by the address number designated by the operation of the input means by the user, the afore-mentioned mouse operation data pre-stored in memory are retrieved. And, the PC is operated automatically by the following described input means.

First, after retrieving the afore-mentioned mouse operation data pre-stored in the afore-mentioned memory by the address number designated by the operation of the input means by the user, and detecting the next mouse click position on the display by the program processing bases upon the reproduced mouse cursor coordinates data, the mouse cursor is shifted consecutively from its current position to its designated position, at a speed the human eyes can recognize as is shifting movement.

Second, after the lapse of time corresponding to the click time interval data, by inputting the mouse click code signal from the PC to the afore-mentioned microcomputer by the reproduced mouse operation data, the mouse click signal generated in the microcomputer is input into the mouse socket of the PC via the signal lead.

At the time of memory mode operation of the afore-mentioned mouse operation representation system, by means of the mouse operation, the pulse signal output from the mouse is first coded in the afore-mentioned microcomputer. And then, by generating the mouse operation coding data consisting of X-axis direction and Y-axis direction shift pulse number in connection with their shifting distance to the designated position, and the time interval between one click and the next one, this pulse signal is input into the PC via the serial port of the PC, and stored in the memory with the address number designated by the operation of the input means by the user, and the afore-mentioned mouse coding data combined, by the mouse operation coding data memory program installed in the PC.

The following concerns the afore-mentioned mouse operation representation system. At the time of mouse operation data reproduction mode of the afore-mentioned mouse operation representation system, by means of the mouse operation coding data memory/reproduction program installed in the PC, the afore-mentioned mouse operation coding data pre-stored in the memory is reproduced by retrieving the address number designated by the operation of the following input means by the user.

1) Means is provided for inputting the reproduced mouse operation coding data into the microcomputer installed in the exterior adaptor device via the serial port.

2) Means is provided for inputting the afore-mentioned mouse control signal into the PC via the mouse signal lead connecting the aforement mentioned exterior adaptor device to the mouse socket of the PC, after generating the mouse control signal consisting of the X-axis and Y-axis direction shift signals for moving the mouse controlled cursor to the designated position on the display and the click signal to be produced at the time interval in compliance with the time data, according to the mouse operation coding data input by the afore-mentioned microcomputer.

With the above input means executed, the PC is automatically operated.

As above explained, the mouse operation representation system of the invention makes a variety of PC automatic processing jobs possible by means of representing mouse operation data pre-stored in the memory just by inputting the address number designated by the operation of the remote control.

Accordingly, it is a further object of the invention to provide:

a) mouse signal representation circuitry operatively connecting to the mouse and to the computer internal circuitry, and responsive to remote control operation to input pre-prepared data to the computer, and b) there also being a mouse signal line or lines operatively connected to the computer internal circuitry, and a keyboard signal line or lines operatively connected to the computer internal circuitry.

A further object is to provide, in combination with a personal computer having internal driving circuitry, a serial port, a mouse connection socket, a key data input keyboard, and a mouse, improvement apparatus for effecting representation by the computer of selected start-up data, that includes a) first means for inputting to said driving circuitry, and via said serial port, reproduced mouse operation coding data, b) an exterior adapter device, and c) second means for inputting into said circuitry, and via said adapter device and said mouse connection socket, a mouse control signal consisting of X-axis and Y-axis direction shift signals for moving the mouse controlled cursor to the designated position on the display.

Yet another object includes the provision of a microcomputer at said adapter device, for receiving the mouse click code signal from said computer circuitry after a lapse of time corresponding to click time interval data, and for inputting into the mouse socket at the computer a mouse click signal generated in the microcomputer.

These and other objects and advantages of the invention, as well as the details of an illustrative embodiment, will be more fully understood from the following specification and drawings, in which:

DETAILED DESCRIPTION

Figure 1:
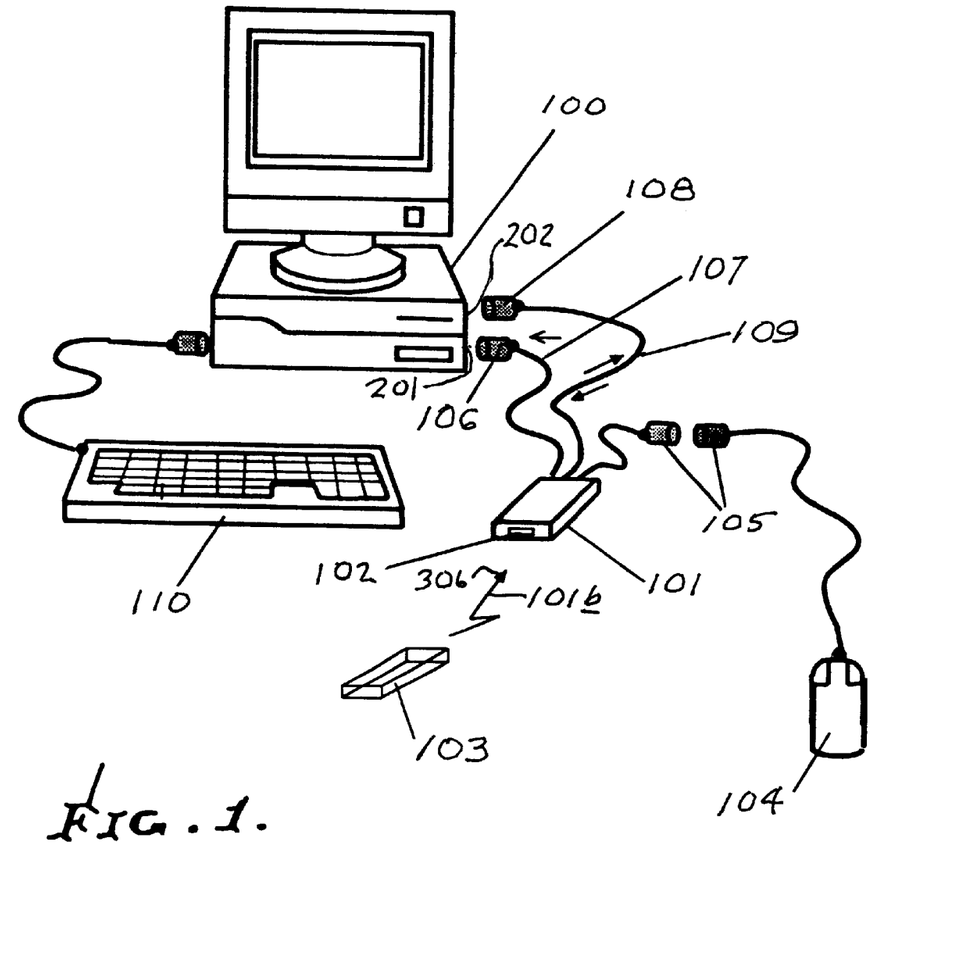
FIG. 1 is a perspective drawing showing one preferred form of apparatus incorporating the invention.

In FIG. 1; 100 is the PC (personal computer). 101 designates the mouse signal representation device designed for the mouse signal process of the invention. 102 is for the light reception section installed in the mouse signal representation device 101, including a receptacle apart from the mouse, which is designed to receive a remote control signal at 306, as by receiving the infrared ray 101*b* from the remote control table including control 103. 104 is for the user's mouse, which is connected to the mouse signal representation device 101 via connectible mouse connector serial components 105. 106 is for the mouse connector which is connected to the mouse socket 201 of the PC 100 and which inputs into the mouse socket of the PC (see FIG. 2) the mouse operation reproduction signal output from the mouse signal representation device 101 via the mouse signal lead 107. The latter consists of plural signal leads or wires in a bundle. 108 is for RS232C connector, which is configured to connect to RS232C connector 202 of the PC, and is designed to transmit and/or to receive the mouse data and the remote control coding data between the mouse signal representation device 101 and the PC 100 via the mouse and the remote control operation data signal lead 109. The latter consists of plural leads in a bundle, which is connected to the mouse signal representation device 101. 110 designates the keyboard.

Figure 2:
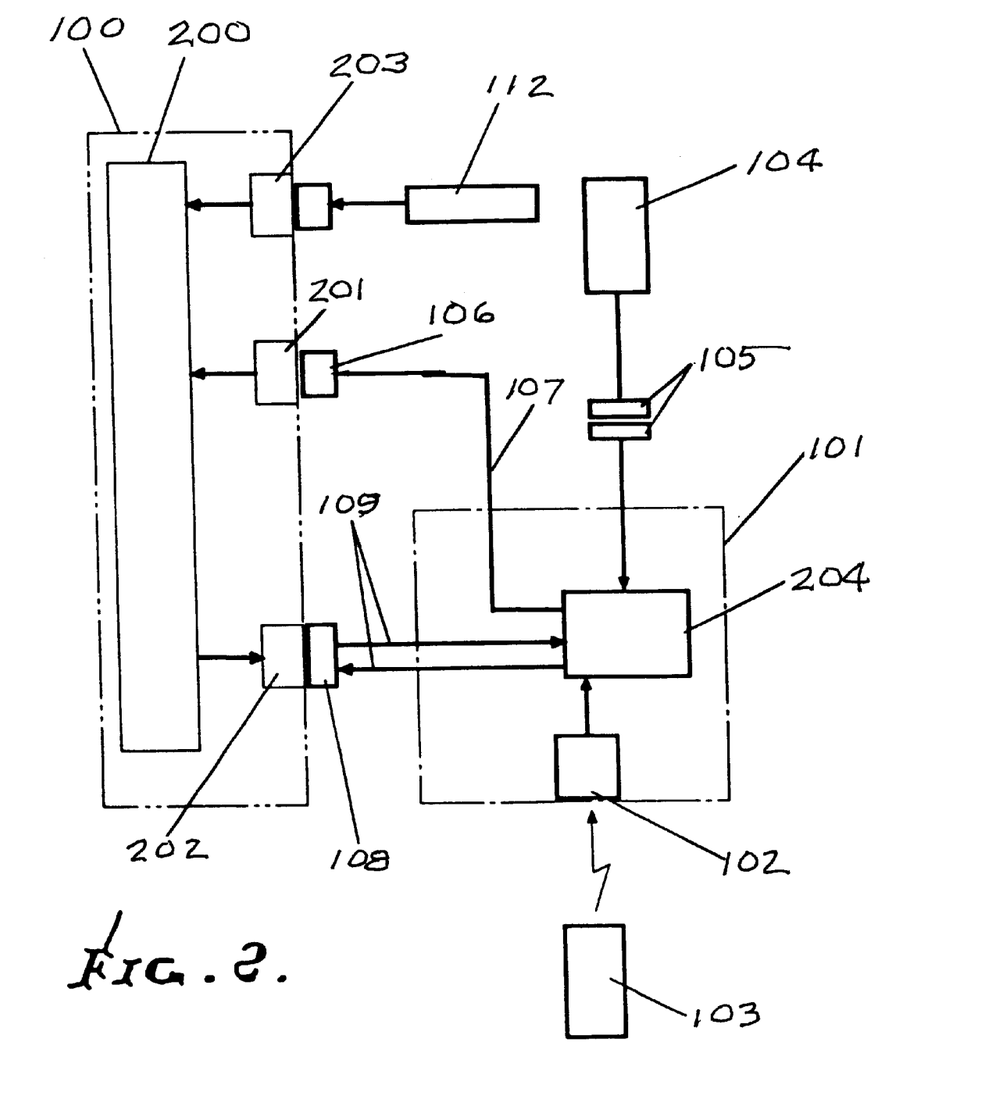
FIG. 2 is a block diagram of circuitry embodied in the invention.

In FIG. 2, 200 is for the computer circuitry in the interior of the PC where the mouse operation data memory/reproduction program is pre-installed.

201 designates the mouse socket of the PC

202 is the RS232C socket of the PC

203 designates the keyboard socket of the PC

204 indicates the one-chip microcomputer (hereinafter called MICON) installed in the mouse signal processing device 101, and which performs such functions as are described below (it may incorporate a ten-keyboard microcomputer as disclosed in parent application referred to above)

the function of inputting into the PC the mouse signal input by the processing of the installed program, as the coding data;

the function of operating the PC automatically by generating the mouse operation signal from the mouse signal coding data input from the PC, and inputting this signal into the mouse socket of the PC;

the function of receiving the remote control key signal from the remote control table, and inputting it into the PC as the key code signal.

102 is for the light reception section of 101.

103 inputs the remote control table.

104 is for the user's mouse connected to the mouse signal representation device 101 via mouse connectors 105.

106 is for the mouse connector connection to 201, and also connected to the mouse signal representation device 101 via mouse signal lead 107.

108 is for RS232C connector, that is connected to 202.

109 is for the signal lead for the mouse 0 and the remote control operation data.

Figure 3:
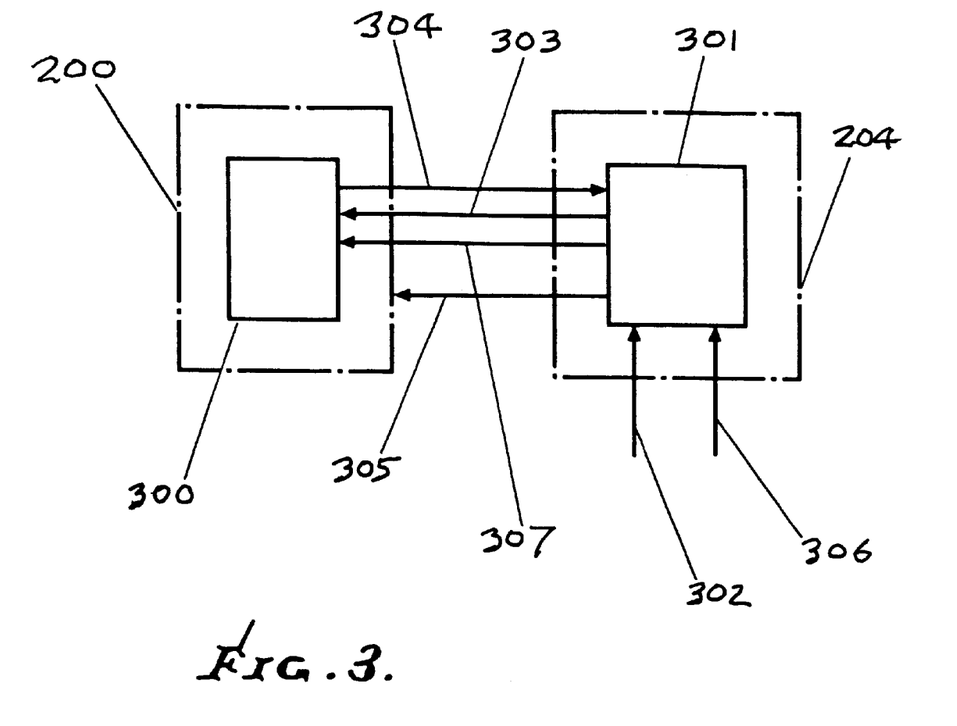
FIG. 3 is the functional block drawing of the system.

FIG. 3 comprises a functional block chart for the program software installed in the mouse operation representation system of the invention.

300 represents the mouse operation data memory/reproduction program installed in the PC circuitry 200.

301 is for the processing program (for the mouse and the remote control signal) installed in the microcomputer 204 in device 101.

In the mouse operation data memory process, 302 indicates the mouse signal from the mouse operated by the user, which is coded by the processing program for the mouse and the remote control signal 306, and then input into the program 300 as the mouse operation signal coding data 303.

Subsequently, in the mouse operation data reproduction process, 304 represents the mouse operation coding data stream reproduced and outputted by the program 300, which is then input into the program 301 and then input into the mouse socket of the PC 200 as the mouse automatic operation signal 305.

306 is for the remote control operation signal input, which is coded by the program 301, and then input into the program 300 as the remote control key code signal 307.

At the time the mouse automatic operation data memory/reproduction is not conducted, the mouse signal 302 of the mouse operated by the user is always input into the mouse signal lead of the PC circuitry 200 as it exists.

Figure 4:
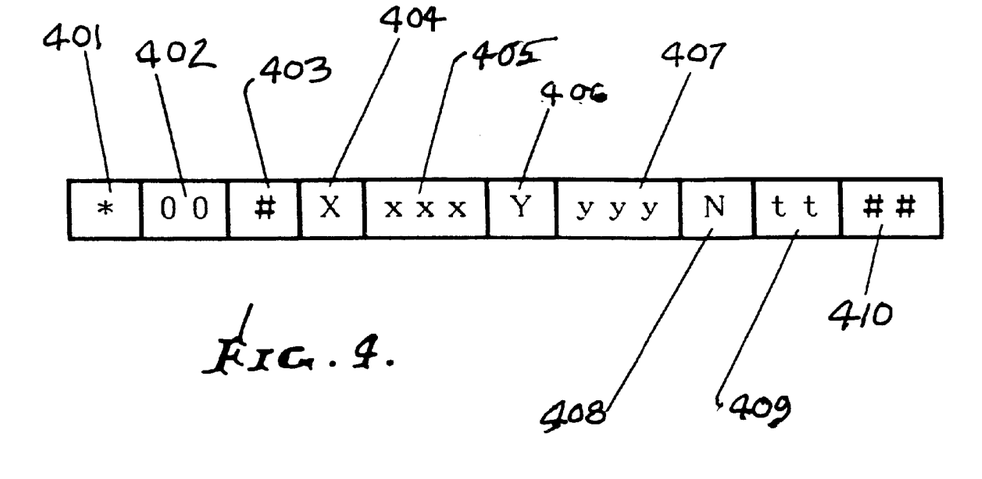
FIG. 4 is a drawing showing data configuration of the mouse automatic operation data.

FIG. 4 is the drawing for the data configuration for the actual practicing instance o the afore-mentioned mouse operation data.

With the mark * in this Figure set as the starting mark 401, a group of mouse operation da a intended for a series of same processing are memorized and reproduced as one group.

402 is for the address number, which is set up according to each of groups of the PC operation information. This address number is used at the time of the data retrieval. The mark # for 403 is the starting mark code indicating the start of the mouse operation data, and all the following data until the end mark ## are treated as the mouse operation information data.

404 is for the code number for the shift direction of cursor on X coordinate, right or left. 1 is set for the right direction, and 2 for the left direction.

405 is for the number of shift pulse for shifting the cursor in the X-axis direction, which is in connection with the shifting distance of cursor.

406 is for the code number for the shift direction of cursor on the Y coordinate, up or down. 3 is set for the downward direction, and 4 for the upward direction.

407 is for the number of shift pulse for shifting the cursor in the Y-axis direction, which is in connection with the shifting distance of cursor.

408 is for the code number, which is indicative of the mouse click status. 00 is for no click, 01 for click execution, and 11 for drag.

409 is for the coding numerical value of the mouse click time interval. 0.1 second is set as 1, so 135 is for 13.5 seconds.

410 is for the completion mark.

Figure 5:
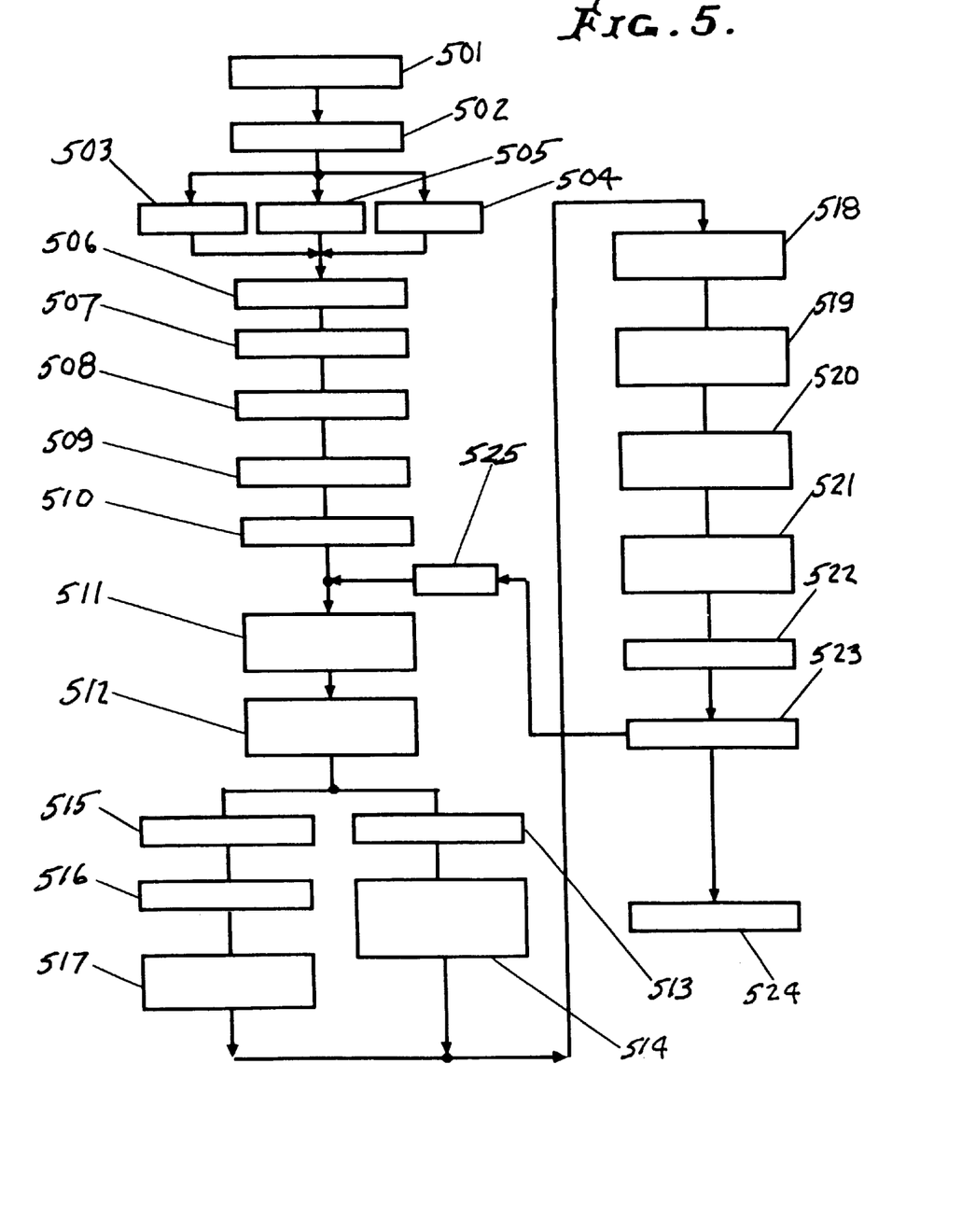
FIG. 5 is a drawing showing the shifting status of mouse cursor at the display at the time of PC automatic operation mode.

FIG. 5 is the flow chart for the process where the mouse operation data pre-memorized are reproduced and then the PC is automatically operated.

After the PC display is set for the designated process for automatic operation, at process 501 the PC automatic operation process (reproduction process) is initiated.

The first appearance is the process 502 for a table of contents. This shows the entire table of contents for every kind of the PC operation data pre-memorized in the memory address installed in the program, along with the address number.

Next comes the process for designation of the address number by the user's operation. Three means are installed for input. They are the input means or remote control table 503, for mouse operation 504 and for keyboard 505.

After the address number input process 506 is executed by any of these means, the execution key is pressed at process 507, and then the PC automatic operation is initiated.

At the process 508 just after this initiation execution, the window of the PC automatic operation program is minimized and kept in the inactive status.

However, at the same time, the designated display for automatic operation is put in the active status at process 509, but based on the mouse operation data output one after another from the PC automatic operation program in an inactive status, the mouse automatic operation signal is input into the mouse socket of tho PC 100 and as a result the mouse cursor as activated object on the display is automatically controlled.

At process 510, the first reproduction process is executed, and at process 511 the Nth step is executed on a successive base.

At process 512, from the reproduced mouse operation data, the X Y coordinates values for the position of the next mouse click in the display are retrieved.

The means for shifting the cursor to the designated position are either of the following.

The one is for the shift and the placement of the mouse cursor by program command a processes 513 and 514.

The other is for the shift and the placement of the mouse cursor by the shift pulse signal generated from the mouse signal representation device at processes 515, 516, and 517.

Either of the above two is executable.

As one of the means, the mouse operation coding data are input into the mouse signal representation device 101 from the PC side at process 515. At process 516, the shift pulse signal is input into the mouse socket of the PC from the mouse signal representation device 101 in order to make the mouse cursor shift. And, at process 517, the mouse cursor placement at the designated position is executed by means of the shift pulse signal.

As the other means, at process 513, toward the designated position of the next mouse cursor on the display, the mouse cursor is shifted by means of the program control at the high speed the user can recognize its shift visually, and it is placed at the designated position by means of the program control. Since the placement no mouse cursor on the display is made directly by means of the program command, it is possible to put the mouse cursor in the right position, even if the position of mouse cursor is deviated because of mulfunction in the course of its shifting.

Subsequently, after the arrival of the mouse cursor at its designated position at process 518, the click signal is input into the mouse signal representation device 101 from the PC side as the mouse operation data at process 519. And, at process 520, the click signal is reproduced at the clicktime interval indicated by the mouse operation data, out of the mouse signal representation device 101.

At process 522, the PC is operated in accordance with the click action.

Next, at process 523, the next step is executed through process 525, until the mouse operation data completion code is retrieved at process 523.

When the mouse operation data completion code is retrieved at process 523, the reproduction process of the mouse operation representation system is completed at process 524.

Figure 6:
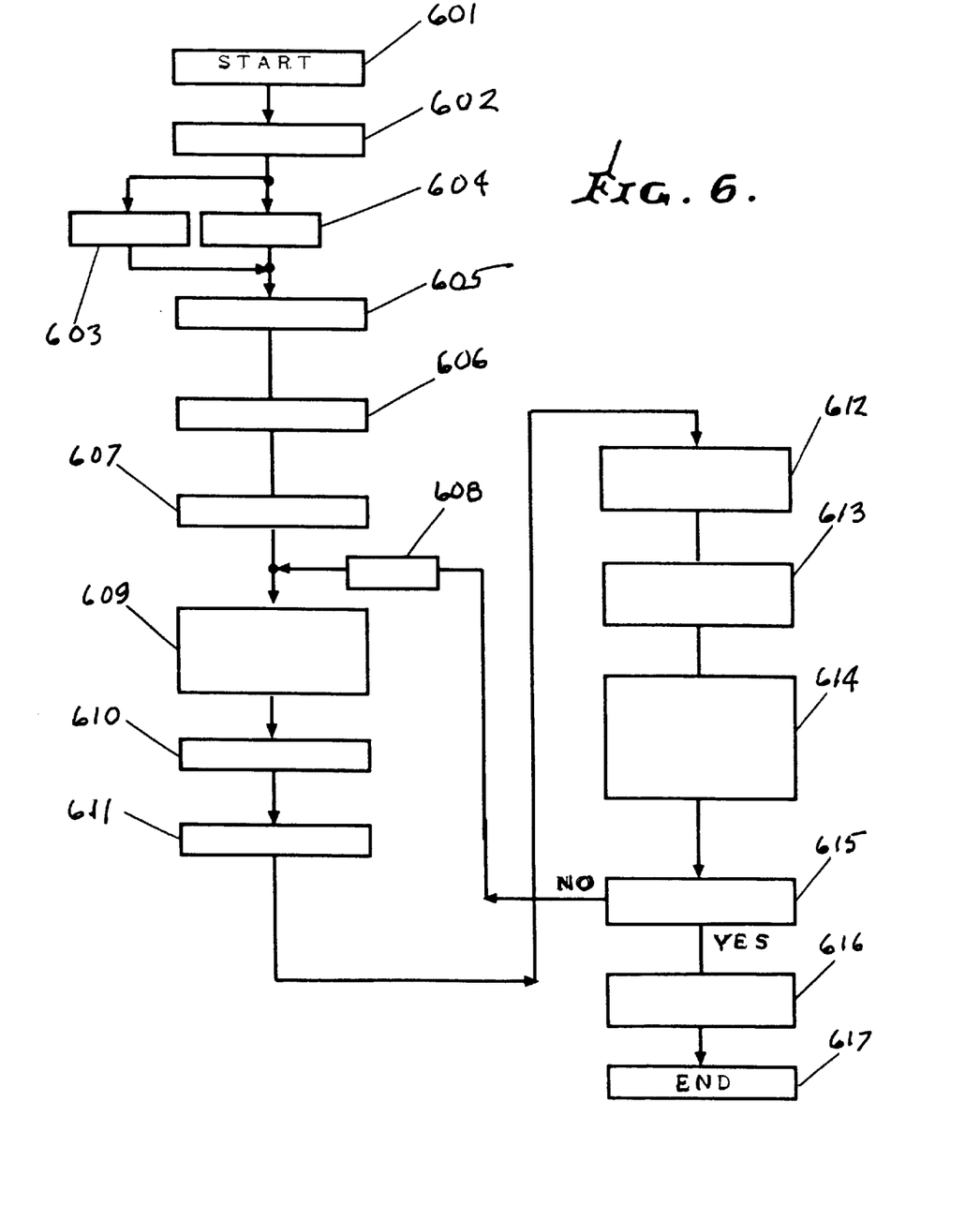
FIG. 6 is a flow chart for the PC automatic operation (reproduction) process.

FIG. 6 is for the flow chart for the mouse operation data production and memory process. After the PC display is set to that for the object to be processed by automatic operation, the mouse operation memory process is initiated at process 601. What appears first is process 602 for a table of contents. The table of various contents of automatic PC operation data pre-stored in the memory address of the program appears on the display along with the respective address numbers.

Then, comes the process for the address number designation by the user operation. As the input means, the means from the remote control table—603 and the means by keyboard—604 are executed. After the address number input process 605 is executed hy these means, the start-up process 606 is executed by pressing the execution key and the process for the mouse operation data production and memory is initiated. Just after this initiation, the window for the PC automatic operation is minimized in size and is kept in an inactive state.

At the same time, the display for the designated object for the automatic operation is put into an active state. What comes next is the successive execution of the mouse operations for the display of the designated object for automatic operation or for the program—by the operation of the user. At each mouse click. the mouse operation data as shown in FIG. 3 are generated in the microcomputer 204 of the mouse signal representation device 101, and input into the PC via the mouse operation data signal lead 109 connected to RS232C socket, an placed in the memory of the PC automatic operation program.

607 is for the process for control of the order of the click operation, with the order set as 1 in the beginning and at addition process 608 with one at a time for addition. At process 609, the mouse cursor is brought to the desired position on the display by the operation of mouse by the user.

When the mouse click operation is made at process 610, the mouse operation data are stored in the memory at each mouse click. On this occassion, the retrival of the values of X Y coordinates for the point on the display at the time of click is made, either by means of the program of microcomputer 204 installed in the mouse signal representation device 101, or by means of the PC automatic operation program installed in the PC 100, or by means of retrieving the click signal only at MICON 204 installed in the mouse signal representation device 101, and inputting YES or NO of the click signal into the PC automatic operation program installed in the PC and retrieving the values of X Y coordinates bit the PC automatic operation program. It is entirely up to the user which of the above means is to be chosen. In this manner, the PC operation process 611 advances. In case of the means of the PC automatic operation program at process 612, the values of X Y coordinates for the point on the display at the time of click are obtained directly by the program command. In case no the means of the microcomputer 204 installed in the mouse signal representation device 101, the positioning data are obtained as the shift pulse number to the designated position.

Subsequently, at process 613, the time interval between one click and the next is measured up in the unit of second. At process 614, the mouse operation data concerning one click are produced by combining the coordinates Values data for the means of click or the shift number data to the click position with he afore-mentioned time interval data in a set.

Next, at process 615, YES or NO of operation of memory completion key is retrieved. In case of NO, the next mouse operation data production process is repeated. In case the memory completion key is pressed, at process 616, the coordinates values data at the afore-mentioned click position produced a each click for plural clicks or shift number data to the click position and the afore-mentioned time interval data and the address data produced at process 605—all these combined in one set, are placed in the memory of the PC automatic operation program installed in the PC.

Figure 7:
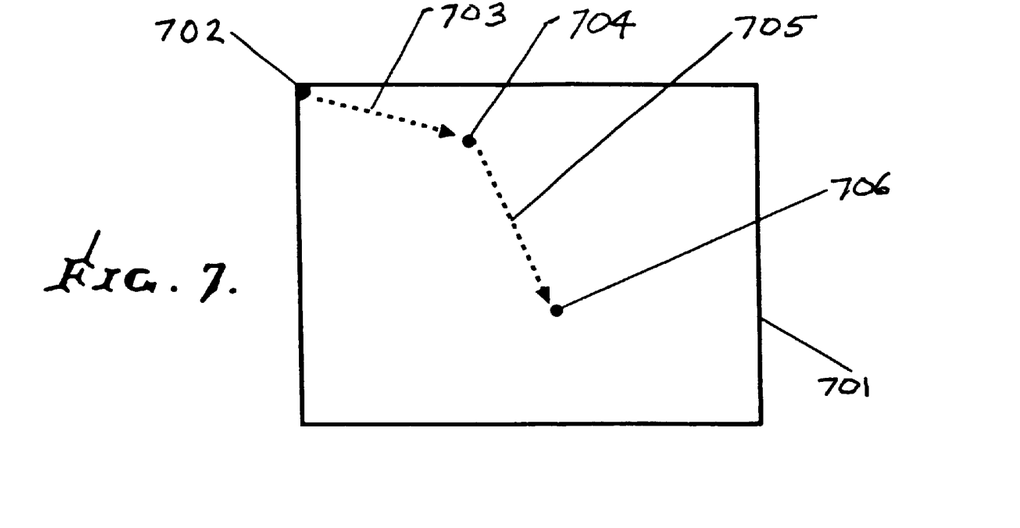
FIG. 7 is a flow chart for the memory process for the PC automatic operation data.

FIG. 7 is for the entire trace of the cursor shown in the PC display 701, at the afore-mentioned reproduction process in the mouse operation reproduction system of the invention in question.

The shifting status of the mouse cursor from its current position on the display to the next click position continues to be shown, while the position of the mouse is shifted gradually from the current position to the next click position at the speed the eyes of the user can catch it visually. This mouse cursor shifting indication shows to the user the direction of the next click position, and also makes it easier for the user to identify the position of the next click.

702 is set as the original starting point on the display for the first placement of mouse cursor at the afore-mentioned reproduction process. The upper left end of the display is fixed as this original starting point.

703 is for the entire trace of mouse cursor at the first step of the automatic reproduction.

704 is for the click position at the first step.

705 is for the entire trace of the mouse cursor at the second step.

706 is for the click position at the second step.

Figure 8:
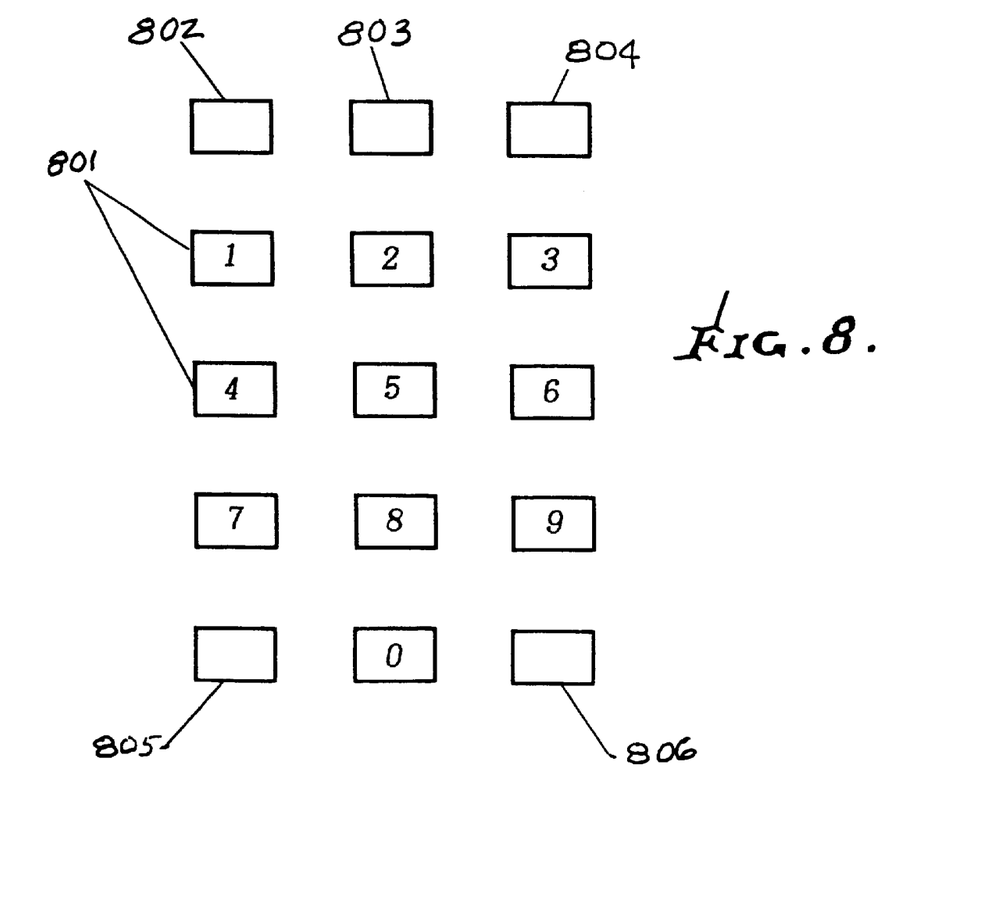
FIG. 8 is the drawing showing key placement of the remote control table.

FIG. 8 is the drawing for remote control key placement.

801 is for ten keys from 0 to 9.
802 is for reproduction key.
803 is for execution key.
804 is for memory key.
805 is for cancellation key.
806 is for completion key.

FURTHER SUMMARY OF THE INVENTION

The mouse operation representation system of the invention makes it possible to represent automatically the same repeated PC operations by only the operation of the start button. This eliminates substantial troublesome procedures.

The system also makes possible automatic connection to the internet at night time, access to the information after its completion, and it offers much help to the inexperienced operator. This also makes possible PC automatic start-up and arrival at the desired display.

Identifying numbers related to Figures are further designated, as follows:

FIG. 1:
100 for PC
101 for Mouse Signal Representation Device
102 for Remote Control Light Reception Section
103 for Remote Control Table
104 for Mouse
105 for Mouse Connector
106 for Mouse Connector
107 for Mouse Signal Lead
108 for RS232C Connector
109 for Mouse Operation Data Signal lead
110 for Keyboard FIG. 2:
200 for PC circuitry
201 for Mouse Socket
202 for R232C Socket
203 for Keyboard Socket
204 for MICON (Microcomputer)

Figure 9:
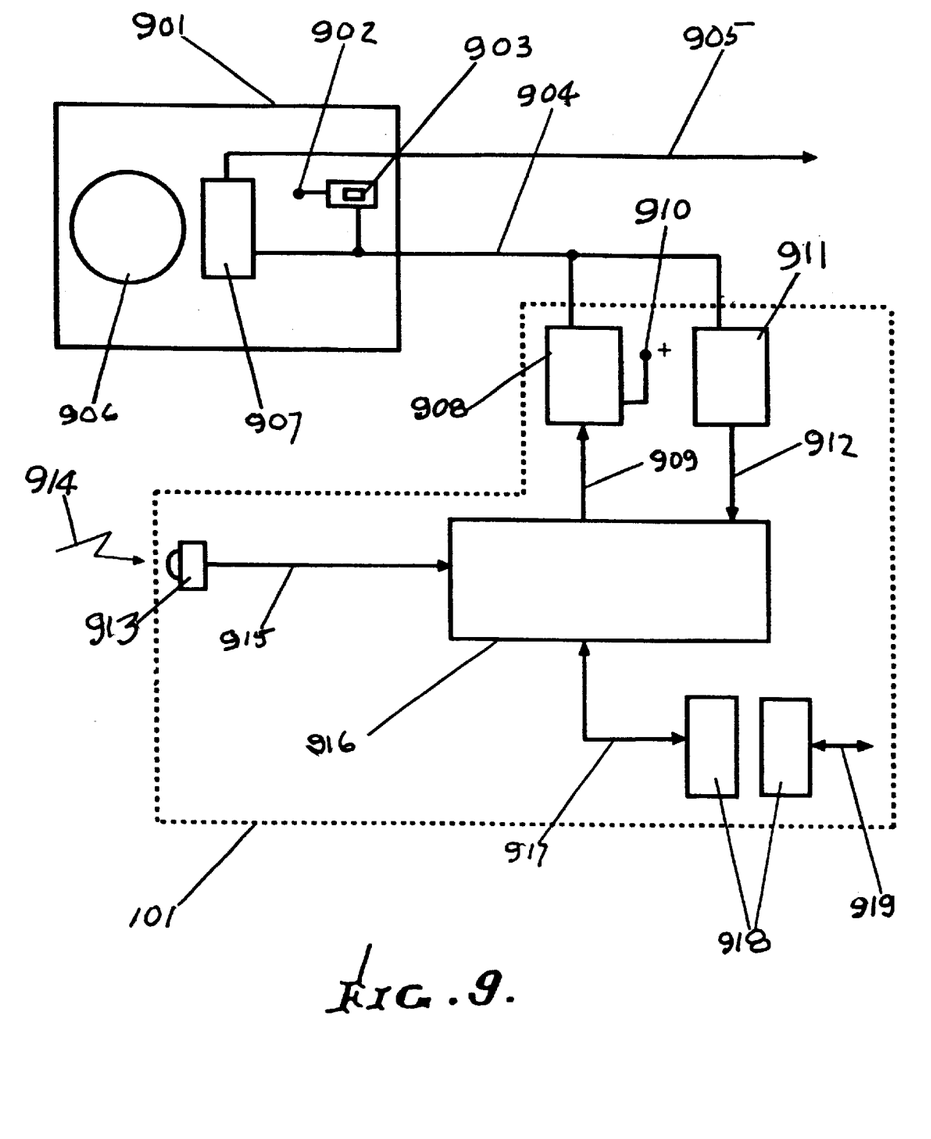
FIG. 9 is a further block diagram of click signal processing means.

FIG. 3:
300 for Mouse Operation Data Memory Reproduction Program installed in PC Circuitry 200
301 for Mouse and Remote Control Signal Process Program
302 for Mouse Signal
303 for Mouse Operation Signal Coding Data
304 for Reproduction Mouse Operation Coding Data
305 for Mouse Automatic Operation Signal
306 for Remote Control Signal
307 for Remote Control Coding Data FIG. 4:
401 for Head Mark
402 for Address Number
403 for Data Head Mark
404 for X Coordinate Shift Direction
405 for X Shift Number
406 for Y Coordinate Shift Direction
407 for Y Shift Number
408 for Click
409 for Time Interval
410 for Completion Mark FIG. 5: Each number shows processing process by program processing.
501 for Reproduction Process Initiation
502 for Display for A Table of Contents
503 for Means of Remote Control Operation Table
504 for Means of Mouse Operation
505 for Means of Keyboard
506 for Address Number Input
507 for Execution
508 for Window Inactivation
509 for Display Screen Indication for processing Object
510 for Execution Order
511 for Nth Step Reproduction
512 for X Y Coordinates Data Retrieval
513 for Cursor Shift Initiation
514 for Mouse Cursor Placement by Program
515 for Data Transmission from PC
516 for Cursor Shift by Shift Pulse
517 for Cursor Placement at Designated Position by Shift Pulse Input
518 for Arrival at Designated Position
519 for Click Signal input into MICON from PC
520 for Click Signal Generation
521 for Click Signal input into PC
522 for PC Activation
523 for Completion Code Retrieval
524 for Completion FIG. 6: Each number shows processing process by program processing
601 for Memory Process Initiation
602 for Table of Contents Indication
603 for the means of Remote Control Operation Table
604 for the means of Keyboard
605 for Address Number Input
606 for Initiation
607 for Execution Order
608 for Nth Execution
609 Mouse Cursor Placement by User's Operation
610 for Click Operation
611 for PC Activation
612 for Reading of Coordinates Values
613 for Time Interval Measuring between Click and Click
614 for Mouse Operation Data Production
615 for Registration Completion Operation 616 for Process for Memory of Mouse Operation Data with Address Number
617 for Completion FIG. 7:
701 for PC Display Screen
702 for Original Point
703 for Mouse Cursor entire trace at First Step
704 for Click Position at First Step
705 for Mouse Cursor entire trace at Second Step
706 for Click Position at Second Step (FIG. 8):
801 for Ten Keys
802 for Reproduction Key
803 for Execution Key
804 for Memory Key
805 for Cancellation Key
806 for Completion Key (FIG. 9)
901 for mouse
902 for +5V power supply lead
903 for switch for left click
904 for click retrieval signal lead
905 for mouse data signal lead
906 for mouse ball
907 for mouse IC
908 for pulse generation circuitry
909 for reproduction click signal
910 for +5V power supply lead
911 for click signal retrieval circuitry
912 for click retrieval signal
913 for light reception device
914 for infrared remote control signal
915 for MICON
916 for remote control signal
917 for click and remote control data lead
918 for RS232C socket
919 for RS232C circuit FIG. 9 is the drawing for the circuitry construction for click signal processing means for the mouse operation representation system of the invention in question.

901 is for the mouse which is equipped with the same construction and functions as the conventional mouse, but with new addition of signal lead 904.

903 is for the switch for left click. When this switch is put on, click retrieval signal lead 904 for mouse control IC 907 is connected to +5V power supply lead 902 and +5V is input into click retrieval lead 904.

905 is for mouse data signal lead which transmits/and receives mouse control signal between mouse control IC and PC circuitry.

906 is for mouse ball.

908 is for pulse generation circuitry. When reproduction click signal 909 output from MICON 916 is input, +5V power supply lead 910 is connected to click retrieval signal lead 904, and +5V is input into click retrieval lead 904. This generates such circuitry activation as equivalent case of the click switch being pressed manually.

Next, 911 is for the click signal retrieval circuitry. When the click switch 903 is presser by the user's operation, click retrieval signal lead 904 is changed to +5V. When this voltage change is retrieved, click retrieval signal 912 is input into MICON 916.

913 is for light reception device. It receives infrared remote control signal 914, retrieves remote control signal 915, and input it into MICON 916.

917 is for the click & remote control data lead, which transmits/and receives the click signal and remote control data signal between MICON 916 and PC via RS232C socket 918 and RS232C circuit 919.

I claim:

1. A device in combination with a personal computer having internal driving circuitry, a key data input keyboard, and a mouse for computer cursor control, the improvement apparatus for effecting re-presentation by the compute of selected pre-prepared start-up data, comprising a) mouse signal representation circuitry operatively connecting to the mouse and to the computer internal circuitry, responsive to remote control operation to input pre-prepared data to the computer, and b) there also being a mouse signal line or lines operatively connected to the computer internal circuitry, and a keyboard signal line or lines operatively connected to the computer internal circuitry, c) and wherein said device incorporates circuitry to receive mouse operation coding data reproduced and outfitted by a program at the computer, and then processed and inputted into a mouse socket at the personal computer in the form of a mouse automatic operation signal.

2. The combination of claim 1 wherein said mouse signal re-presentation circuitry is one of the following:

i) located at the mouse
   ii) located apart from, but connected to the mouse and also connected to the computer circuitry.

3. The combination of claim 1 wherein said mouse signal representation circuitry includes a device associated with said mouse signal re-presentation circuitry, said device having a remote control light reception section.

4. The combination of claim 3 wherein said device includes a receptacle, and said section is received in the receptacle.

5. The combination of claim 3 wherein said mouse signal re-presentation circuitry is located at said device, and is apart from the mouse.

6. The combination of claim 1 wherein said circuitry a said device has an input for a remote control signal, which is coded at said device and then inputted to the program at the computer, as a remote control key code signal.

7. The combination of claim 1 wherein said device has a disconnectible connection to the computer for disabling said device, the mouse also having a connection to the computer circuitry input for mouse operation to the computer independently of said device.

8. The combination of claim 1 including means for storing mouse cursor operation data inclusive of the shift pulse number, in the microcomputer memory at the mouse, whereby in response to initiated operation the mouse cursor is shifted to a designated display screen position, and at this position, by pushing a designated button, the shift pulse number data is produced in accordance with the shifting distance of the mouse cursor in the X-axis and Y-axis directions, and the mouse data inclusive of click operation and time interval data from click to click are produced and stored in said memory.

9. In combination with a personal computer having internal driving circuitry, a serial port, a mouse connection socket, a key data input keyboard, and a mouse, improvement apparatus for effecting re-presentation by the computer of selected start-up data, comprising a) first means for inputting to said circuitry, and via said serial port, reproduced mouse operation coding data, and b) an exterior adapter device, and c) second means for inputting at said circuitry, and via said adapter device and said mouse connection socket, a mouse control signal consisting of X-axis and Y-axis direction shift signals for moving the mouse controlled cursor to the designated position on the display.

10. The combination of claim 9 including a microcomputer at said adapter device, for receiving the mouse click code signal from said computer circuitry after a lapse of time corresponding to click time interval data, and for inputting into the mouse socket a mouse click signal generated in the microcomputer.

11. The combination of claim 9 wherein said adapter device comprises a mouse signal re-presentation device connected between the mouse and said personal computer circuitry, and which incorporates a microcomputer.

12. The combination of claim 11 including serial connectors between said drive and said mouse.

13. The combination of claim 11 including a primary connector between said device and said serial port, and a secondary connector between said device and said mouse connector socket.

14. The combination of claim 13 including serial connectors between said drive and said mouse.

15. The combination of claim 14 including an infra red signal receptor at said device.

16. A mouse operation representation system having a microcomputer for mouse signal control, which operates in parallel to and independently of circuitry of a personal computer having a serial port and a mouse port comprising in combination:

a) means to memorize and reproduce mouse operation data by connecting the mouse of the user's operation to the said microcomputer, and further connecting the serial port and the mouse socket of the personal computer to the microcomputer, and operating in concert with the program installed in the personal computer and the program installed in the microcomputer, and b) the microcomputer located apart from the personal computer and the mouse.

17. The combination of claim 16 wherein at the mouse operation data memory mode of the afore-mentioned mouse operation representation system, there is a means for coding the click signal output from the mouse by operating the mouse connected to the afore-mentioned microcomputer, and then inputting this mouse click code signal into the PC at real time via the signal lead connecting the input/output port of the PC to the microcomputer.

18. The combination of claim 17 wherein there is means for identifying the input of the afore-mentioned mouse click code signal as the mouse click operation by the mouse operation data memory/reproduction program installed in the PC and setting up the data obtained for X and Y coordinates values of the cursor on the display at this moment by coordinates value retrieval command of the program, as the data for cursor coordinates position on the display at the time of click.

19. The combination of claim 18 wherein there is a means for computing the time interval between the previous click and the next click by the program, and setting up the computer value as the click time interval data.

20. The combination of claim 19 wherein means are provided where in the click time interval data and the afore-mentioned mouse cursor coordinates data are put into one set, and are stored into the memory of the program installed in the PC by giving the address number designated by the user to plural sets of data obtained as the set in the same manner as earlier mentioned.

21. The combination of claim 20 including means whereby at the time of reproduction mode of the afore-mentioned mouse operation reproduction system, the afore-mentioned mouse operation data pre-stored in the memory are retrieved by the address number designated by the operation of the inputting means by the user.

22. The combination of claim 21 including inputting means whereby after retrieving the afore-mentioned mouse operation data pre-stored in the afore-mentioned memory by the address number designated by the operation of the input means by the user, and detecting the next mouse click position on the display by the program processing based upon the reproduced mouse cursor coordinates data, the mouse cursor is shifted consecutively from its current position to its designated position, at a speed the human eyes can recognize such shifting movement.

23. The combination of claim 22 including means whereby after the lapse of time corresponding to the click time interval data, by inputting the mouse click code signal from the PC to the afore-mentioned microcomputer by the reproduced mouse operation data, the mouse click signal generated in the microcomputer is input into the mouse socket of the PC via the signal lead.

24. The combination of claim 23 whereby at the time of memory mode of the afore-mentioned mouse operation presentation system, by means of mouse operation, the pulse signal output from the mouse is first coded in the afore-mentioned microcomputer, and by generating the mouse operation coding data consisting of X-axis and Y-axis direction shift pulse number in compliance with their shift distance to the designated position on the display, and the time interval data between one click and the next, such pulse signal is input into the PC via the serial port of the PC and stored in memory by means of a mouse operation coding data memory program installed in the PC, with combination of the address number designated by the operation of the input means by the user and the afore-mentioned mouse operation coding data.

25. The combination of claim 20 whereby at the time of mouse operation data reproduction mode of the afore-mentioned mouse operation representation system, by means of the mouse operation coding data memory/reproduction program installed in the PC, the afore-mentioned mouse operation coding data pre-stored in the memory is reproduced by retrieval of the address number designated by the operation of the following included input means by the user:

a) means for inputting the reproduced mouse operating coding data into the microcomputer installed in the exterior adaptor device via the serial port, and b) means for inputting the afore-mentioned mouse control signal into the PC via the mouse signal lead connecting the afore-mentioned exterior adaptor device to the mouse socket of the PC, after generating the mouse control signal consisting of the X-axis and Y-axis direction shift signal for moving the mouse to the designated position on the display and the click signal to be produced at the time interval in compliance with the time data according to the mouse operation coding data input by the afore-mentioned microcomputer.

26. The combination of claim 20 including remote control signal reception/reproduction means connected to the afore-mentioned microcomputer, the key operation signal being emitted from the remote control table in the form of lighting being coded, and such key signal coding data are inputted into the PC along with the afore-mentioned mouse operation coding signal, combined.

* * * * *